United States Patent
Xia

(10) Patent No.: US 11,271,827 B2
(45) Date of Patent: *Mar. 8, 2022

(54) NETWORK SERVICE LIFE CYCLE MANAGEMENT GRANT METHOD AND APPARATUS

(71) Applicant: Huawei Technologies Co., Ltd., Shenzhen (CN)

(72) Inventor: Haitao Xia, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/146,091

(22) Filed: Jan. 11, 2021

(65) Prior Publication Data

US 2021/0135958 A1 May 6, 2021

Related U.S. Application Data

(63) Continuation of application No. 16/415,840, filed on May 17, 2019, now Pat. No. 10,911,333, which is a
(Continued)

(51) Int. Cl.
*G06F 15/173* (2006.01)
*H04L 41/5054* (2022.01)
(Continued)

(52) U.S. Cl.
CPC ...... *H04L 41/5054* (2013.01); *G06F 9/45558* (2013.01); *H04L 41/082* (2013.01);
(Continued)

(58) Field of Classification Search
CPC . H04L 41/5054; H04L 41/5041; H04L 41/28; H04L 41/082; H04L 41/0823; H04L 41/0886; H04L 41/14
See application file for complete search history.

(56) References Cited

U.S. PATENT DOCUMENTS

2016/0205004 A1* 7/2016 Chou ............... H04L 41/142
709/224
2016/0323200 A1* 11/2016 Xiang ............... G06F 9/45558
(Continued)

FOREIGN PATENT DOCUMENTS

CN 101552739 A 10/2009
CN 101387976 B * 6/2010
(Continued)

OTHER PUBLICATIONS

"IFA020 composite NS instantiation," XP014278816, NFVIFA(16)000933r2, pp. 1-3 (Sep. 13, 2016).
(Continued)

*Primary Examiner* — Richard G Keehn
(74) *Attorney, Agent, or Firm* — Leydig, Voit & Mayer, Ltd.

(57) ABSTRACT

This application provides a network service life cycle management grant method, including: receiving, by a first NFVO, an NS LCM operation request from a sender, where the NS LCM operation request carries an identifier of a first NS instance and a type of an NS LCM operation; sending, by the first NFVO, a grant request to a second NFVO based on the NS LCM operation request, to request the second NFVO to permit the first NFVO to perform virtual resource management for the NS LCM operation performed for the first NS instance. Accordingly, a grant management mechanism is used between the first NFVO and the second NFVO, to implement target consistency.

18 Claims, 11 Drawing Sheets

Related U.S. Application Data continuation of application No. PCT/CN2016/106288, filed on Nov. 17, 2016.

(51) Int. Cl.
*H04L 41/082* (2022.01)
*H04L 41/0823* (2022.01)
*H04L 41/08* (2022.01)
*H04L 41/14* (2022.01)
*H04L 41/5041* (2022.01)
*H04L 41/28* (2022.01)
*G06F 9/455* (2018.01)

(52) U.S. Cl.
CPC ...... *H04L 41/0823* (2013.01); *H04L 41/0886* (2013.01); *H04L 41/14* (2013.01); *H04L 41/28* (2013.01); *H04L 41/5041* (2013.01); *G06F 2009/45595* (2013.01)

(56) References Cited

U.S. PATENT DOCUMENTS

| | | | |
|---|---|---|---|
| 2016/0328259 A1* | 11/2016 | Xia | H04L 63/102 |
| 2017/0048165 A1* | 2/2017 | Yu | H04L 47/82 |
| 2017/0078143 A1 | 3/2017 | Zhao | |
| 2017/0244596 A1 | 8/2017 | Chen | |
| 2018/0004563 A1* | 1/2018 | Miyazaki | G06F 9/45558 |
| 2018/0131557 A1* | 5/2018 | Chou | H04L 41/08 |
| 2018/0146031 A1* | 5/2018 | Li | H04L 63/107 |

FOREIGN PATENT DOCUMENTS

| | | | |
|---|---|---|---|
| CN | 101387976 B | | 6/2010 |
| CN | 101217678 B | * | 8/2011 |
| CN | 101217678 B | | 8/2011 |
| CN | 105282765 A | | 1/2016 |
| CN | 105429780 A | | 3/2016 |
| CN | 105429839 A | | 3/2016 |
| CN | 105812171 A | | 7/2016 |
| WO | 2015180068 A1 | | 12/2015 |
| WO | 2016000382 A1 | | 1/2016 |
| WO | 2016114866 A1 | | 7/2016 |
| WO | 2016121736 A1 | | 8/2016 |
| WO | 2016121882 A1 | | 8/2016 |

OTHER PUBLICATIONS

"IFA020 composite NS termination," XP014278814, NFVIFA(16)0001274, pp. 1-2 (Sep. 13, 2016).

"IFA020 Actor role of NFVO in NS provided using multiple administrative domains," XP014278574, NFVIFA(16)000931r13, pp. 1-3 (Jun. 12, 2016).

"Network Functions Virtualisation (NFV); Management and Orchestration; Os-Ma-Nfvo reference point -Interface and Information Model Specification," ETSI GS NFV-IFA013 V2.1.1, XP002794414, pp. 1-127 (Oct. 2016).

"IFA020 composite NS instantiation," NFV IFA#33-F2F-Sophia Antipolis, INFVIFA(16)000933R2, pp. 1-3, European Telecommunications Standards Institute, Sophia-Antipolis, France (Sep. 2016).

U.S. Appl. No. 16/415,840, filed May 17, 2019.

* cited by examiner

NETWORK SERVICE LIFE CYCLE MANAGEMENT GRANT METHOD AND APPARATUS

CROSS-REFERENCE TO RELATED APPLICATIONS

This application is a continuation of U.S. patent application Ser. No. 16/415,840, filed on May 17, 2019, which is a continuation of International Application No. PCT/CN2016/106288, filed on Nov. 17, 2016. All of the afore-mentioned patent applications are hereby incorporated by reference in their entireties.

TECHNICAL FIELD

Embodiments of this application relate to communications technologies, and in particular, to a network service life cycle management grant method and an apparatus.

BACKGROUND

In a network function virtualization (NFV) technology, a telecommunications network operator decouples software from hardware for implementation of some telecommunications network functions in a universal cloud server, a switch, and a memory based on a virtualization technology in an information technology (IT) field. This technology requires that a telecommunications network function is implemented in a form of software, can run on universal server hardware, and can be migrated, instantiated, and deployed at different physical locations on a network based on a requirement.

In the NFV, a virtualized network service (NS) may be implemented by several virtualized network function (VNF) modules. The VNF is software implementation of a network function that can be deployed on an NFV infrastructure.

At present, the NFV technology mainly focuses on dynamic management and orchestration (MANO) of virtualized network functions and virtualized resources. FIG. 1 shows a functional architecture of NFV MANO.

In an end to end (E2E) network function virtualization architecture, a network function virtualization infrastructure (NFVI) includes underlying hardware (HW) resources that may be specifically classified into computing hardware, storage hardware, network hardware, and the like. A virtualization layer is above the hardware layer, and includes a host operating system (Host OS) and a super management program/virtual machine manager (Hypervisor). At least two virtual machines (VM) run above the virtualization layer. A plurality of virtualized network function VNF instances above the NFVI are connected to an OSS/BSS system by using an EMS system.

The NFVI is connected to a virtualized infrastructure manager (VIM) by using an Nf-Vi interface, the VNF is connected to a VNF manager (VNFM) by using a Ve-Vnfm interface, and the VIM and the VNFM are connected by using a Vi-Vnfm interface. The VIM is connected to a network functions virtualization orchestrator (NFVO) by using an Or-Vi interface, the VNFM is connected to the NFVO by using an Or-Vnfm interface, and the NFVO is connected to the OSS/BSS by using an Os-Ma-nfvo interface.

The OSS/BSS is configured to initiate a network service life cycle management request to the NFVO, and the NFVO is responsible for orchestrating management resources based on the network service life cycle management request initiated by the OSS/BSS, to implement network service life cycle management; and monitoring running status information of VNF and NFVI resources in real time. The VNFM is responsible for life cycle management of VNFs, such as instantiation, scaling, healing, and VNF instance termination. The VIM is responsible for managing and allocating NFVI resources, and detecting and collecting NFVI running status information.

In an existing functional architecture of NFV MANO, an NFVO performs resource management for an NS instance managed by the NFVO. When a VNFM in a management domain of the NFVO receives a life cycle management (LCM) operation request for a member VNF instance of the NS instance, the VNFM first needs to request a resource management grant (Granting) from the NFVO to perform a life cycle management operation on the VNF instance. After the NFVO agrees to grant the VNF LCM operation request, the VNFM can further interact with a VIM, to complete resource management in the VNF LCM operation.

However, an existing resource management grant mechanism is applicable only to life cycle management of member VNF instances of NS instances managed by a same NFVO. Referring to a system architecture shown in FIG. 1, virtual resource sets managed by one NFVO belong to one management domain, and virtual resource sets managed by different NFVOs belong to different management domains. Specifically, a management domain is a MANO management function entity set that includes one NFVO and one or more VNFMs within a management scope of the NFVO. Each management domain is corresponding to a management scope of one NFVO, and the NFVO is configured to provide a network service for a specific set in the management domain. In addition, one management domain may further include one or more VIMs and one or more data centers managed by each VIM.

However, with development of services, some NS instances may need to be provided in a plurality of management domains, and virtual resources managed by a plurality of NFVOs need to be used. For example, a large service provider provides a global NS of the service provider through collaboration of branches, and each branch deploys an NFV MANO system including at least one NFVO and constructs a management domain of the branch.

As shown in FIG. 2, an NS1 includes an NS2, the NS1 needs to use 0 to N VNF instances and 0 to N physical network function PNF (Physical Network Function) instances, and the NS2 needs to use 1 to N VNF (205) instances and 0 to N PNF (206) instances.

For ease of understanding, because the NS1 further includes the NS2, the NS1 is referred to as a composite NS, and the NS2 included in the NS1 may be referred to as a nested NS. The nested NS is provided by a management domain different from that of the composite NS. One composite NS may include one or more nested NSs. In this application, a composite NS instance may be further understood as a second NS instance, and a nested NS instance may be further understood as a first NS instance.

If the existing resource management grant mechanism is used, and an NFVO managing the composite NS and an NFVO managing the nested NS separately perform, with a VNFM in a management domain to which the NFVO belongs, a resource management grant process for a VNF LCM operation, a target conflict may occur between a life cycle management operation performed by the nested NS instance and a life cycle management operation performed by the composite NS instance. For example, the NFVO managing the nested NS receives a scaling operation sent by an OSS/BSS for the nested NS instance, and in this case, the NFVO managing the composite NS is performing a healing operation on the composite NS instance to which the nested NS instance belongs. The healing operation requires that the nested NS instance remain unchanged in capacity, and a recovery operation after invalidation is performed on another nested NS instance that is diagnosed to be invalid or an invalid VNF instance.

SUMMARY

This application provides a network service life cycle management grant method and an apparatus, to resolve a problem of a target conflict in resource management execution in an LCM management operation of a nested NS and an LCM management operation of a composite NS in a scenario in which the composite NS and the member nested NS of the composite NS are provided in a plurality of management domains.

According to a first aspect, an embodiment of this application provides a network service life cycle management grant method applied to a scenario in which a composite NS and a member nested NS of the composite NS are provided in a plurality of management domains, including:

receiving, by a first network functions virtualization orchestrator, a network service life cycle management operation request, where the NS LCM operation request carries an identifier of a first NS instance and a type of an NS LCM operation, the identifier of the first NS instance is used to indicate a nested NS instance for which the LCM operation is performed, and the type of the NS LCM operation is used to indicate a specific category of the NS LCM operation; sending, by the first NFVO, a grant request to a second NFVO based on the NS LCM operation request, to request the second NFVO to permit the first NFVO to perform virtual resource management for the NS LCM operation performed for the first NS instance, where the grant request carries the identifier of the first NS instance and the type of NS LCM operation; sending, by the second NFVO, a grant response to the first NFVO based on the grant request; and performing, by the first NFVO based on the grant response, virtual resource management for the NS LCM operation performed for the first NS instance. According to this network service life cycle management grant method, the second NFVO determines, based on the grant request of the first NFVO, impact of an LCM operation performed for a nested NS instance managed by the first NFVO on a current LCM operation performed for a composite NS instance managed by the second NFVO, and sends, based on the impact, the grant response for the NS LCM operation performed for the first NS instance, to ensure target consistency between the life cycle management operation performed for the nested NS instance and the life cycle management operation performed for the composite NS instance to which the nested NS instance belongs.

In a first implementation of the first aspect, the sending, by the first NFVO, a grant request to a second NFVO based on the NS LCM operation request includes: locally obtaining, by the first NFVO, a stored tenant identifier based on the identifier of the first NS instance, and obtaining identification information of the second NFVO based on the tenant identifier; and sending, by the first NFVO, the grant request to the second NFVO based on the identification information of the second NFVO. In this implementation, the first NFVO can quickly find the second NFVO through addressing, to send the grant request to the second NFVO.

In a second implementation of the first aspect, the first NS instance managed by the first NFVO is a member of a second NS instance managed by the second NFVO.

In a third implementation according to the first aspect, the first implementation, or the second implementation, the grant request further includes:

a virtual resource management plan for the NS LCM operation performed for the first NS instance, where the virtual resource management plan includes:

a type, a quantity, and/or a location of a virtual resource that needs to be added, deleted, or modified for the NS LCM operation with reference to a status of a current resource used by the first NS instance; or a type, a quantity, and/or a location of a virtual resource that is actually occupied in the NS LCM operation by a member VNF instance included in the first NS instance, and/or a type, a quantity, and/or a location of a virtual resource that is actually occupied in the NS LCM operation by a member VL instance included in the first NS instance. In this implementation, the first NFVO determines the resource management plan for the NS LCM operation performed for the first NS instance before the grant request, and adds the resource management plan to the grant request, so that the second NFVO can determine, in a more targeted manner, the impact of the LCM operation performed for the nested NS instance managed by the first NFVO on the LCM operation performed for the composite NS instance managed by the second NFVO, and a determining result is more targeted and accurate.

In a fourth implementation of the first aspect, the second NFVO further determines, based on at least one piece of the following locally stored information, whether the NS LCM operation performed for the first NS instance affects the second NS instance managed by the second NFVO:

a running status of a member NS instance that is of the second NS instance managed by the second NFVO and that has a dependency relationship with the first NS instance, and/or a running status of a member VNF instance that is of the second NS instance managed by the second NFVO and that has a dependency relationship with the first NS instance;

an affinity and/or anti-affinity rule that is defined under the second NS instance managed by the second NFVO and that is associated with the first NS instance; and a grant policy for the NS LCM operation performed for the second NS instance.

In this implementation, the second NFVO not only needs to determine the impact of the nested NS LCM operation on the composite NS instance LCM operation, but also needs to determine, according to an affinity/anti-affinity rule of the member nested NS instance and the member VNF instance of the composite NS instance, a location requirement for a resource that needs to be allocated to the nested NS instance LCM operation, and determine, based on the grant policy for the NS LCM operation performed for the second NS instance, a location and a quantity of a resource that needs to be allocated to the nested NS instance LCM operation, to ensure feasibility of resource allocation.

In a fifth implementation of the first aspect, the network service life cycle management grant method further includes: updating, by the second NFVO based on a virtual resource view of the second NS instance managed by the second NFVO and at least one piece of the information, the virtual resource management plan for the NS LCM operation performed for the first NS instance, where the grant response includes an operation success indication, and further includes a virtual resource management plan that is updated by the second NFVO and that is for the NS LCM operation performed for the first NS instance; and the first NFVO performs virtual resource management based on the updated virtual resource management plan for the NS LCM operation performed for the first NS instance.

In this implementation, the second NFVO determines, based on the virtual resource view of the second NS instance managed by the second NFVO and the affinity/anti-affinity rule of the member nested NS instance and the member VNF instance of the composite NS instance, the location requirement for the resource that needs to be allocated to the nested NS instance LCM operation, and adjusts the virtual resource management plan for the nested NS instance LCM operation based on the grant policy for the NS LCM operation performed for the second NS instance, to avoid initiating a new grant request by the first NFVO, and improve NS LCM operation efficiency.

According to a second aspect, an embodiment of this application provides a network service life cycle management grant method, including: receiving, by a second NFVO, an NS LCM operation grant request sent by a first NFVO, where the grant request carries an identifier of a first NS instance and a type of an NS LCM operation; determining, by the second NFVO based on the identifier of the first NS instance, the type of the NS LCM operation, and a virtual resource view of a second NS instance managed by the second NFVO, whether the NS LCM operation performed for the first NS instance affects the second NS instance managed by the second NFVO; and sending a grant response to the first NFVO based on a determining result.

In a first implementation of the second aspect, the method further includes: further determining, by the second NFVO based on at least one piece of the following locally stored information, whether the NS LCM operation performed for the first NS instance affects the second NS instance managed by the second NFVO:

a running status of a member NS instance that is of the second NS instance managed by the second NFVO and that has a dependency relationship with the first NS instance, and/or a running status of a member VNF instance that is of the second NS instance and that has a dependency relationship with the first NS instance;

an affinity and/or anti-affinity rule that is defined under the second NS instance managed by the second NFVO and that is associated with the first NS instance; and a grant policy for an NS LCM operation performed for the second NS instance.

In a second implementation according to the second aspect or the first implementation of the second aspect, the grant request further includes a virtual resource management plan for the NS LCM operation performed for the first NS instance, and the virtual resource management plan includes:

a type, a quantity, and/or a location of a virtual resource that needs to be added, deleted, or modified for the NS LCM operation with reference to a status of a current resource used by the first NS instance; or a type, a quantity, and/or a location of a virtual resource that is actually occupied in the NS LCM operation by a member VNF instance included in the first NS instance, and/or a type, a quantity, and/or a location of a virtual resource that is actually occupied in the NS LCM operation by a member VL instance included in the first NS instance.

In a third implementation according to the second implementation of the second aspect, the method further includes:

updating, by the second NFVO based on the virtual resource view of the second NS instance managed by the second NFVO and at least one piece of the locally stored information, the virtual resource management plan for the NS LCM operation performed for the first NS instance, where the grant response includes an operation success indication, and further includes a virtual resource management plan that is updated by the second NFVO and that is for the NS LCM operation performed for the first NS instance, to instruct the first NFVO to implement virtual resource management based on the updated virtual resource management plan for the NS LCM operation performed for the first NS instance.

According to a third aspect, an embodiment of this application provides a network functions virtualization orchestrator NFVO, including a receiving unit, a processing unit, and a sending unit that are sequentially connected, where:

the receiving unit is configured to receive an NS LCM operation request, where the NS LCM operation request carries an identifier of a first NS instance and a type of an NS LCM operation;

the sending unit is configured to send a grant request to a second NFVO based on the NS LCM operation request, to request the second NFVO to permit the NFVO to perform virtual resource management for the NS LCM operation performed for the first NS instance, where the grant request carries the identifier of the first NS instance and the type of the NS LCM operation, and the first NS instance managed by the NFVO is a member of a second NS instance managed by the second NFVO;

the receiving unit is further configured to receive a grant response sent by the second NFVO based on the grant request; and the processing unit is configured to perform, based on the grant response, virtual resource management for the NS LCM operation performed for the first NS instance.

In a first implementation of the third aspect, that the sending unit sends a grant request to a second NFVO based on the NS LCM operation request includes:

the sending unit locally obtains a stored tenant identifier based on the identifier of the first NS instance, and obtains identification information of the second NFVO based on the tenant identifier; and the sending unit sends the grant request to the second NFVO based on the identification information of the second NFVO.

In a second implementation according to the third aspect or the first implementation of the third aspect, the grant request sent by the sending unit further includes:

a virtual resource management plan for the NS LCM operation performed for the first NS instance, where the virtual resource management plan includes: a type, a quantity, and/or a location of a virtual resource that needs to be added, deleted, or modified for the NS LCM operation with reference to a status of a current resource used by the first NS instance; or a type, a quantity, and/or a location of a virtual resource that is actually occupied in the NS LCM operation by a member VNF instance included in the first NS instance, and/or a type, a quantity, and/or a location of a virtual resource that is actually occupied in the NS LCM operation by a member VL instance included in the first NS instance.

In a third implementation according to the third aspect, or the first implementation or the second implementation of the third aspect, the grant response received by the receiving unit includes an operation success indication, and that the processing unit performs, based on the grant response, virtual resource management for the NS LCM operation performed for the first NS instance includes: the processing unit performs virtual resource management based on the virtual resource management plan for the NS LCM operation performed for the first NS instance.

In a fourth implementation according to the third aspect, or the first implementation or the second implementation of the third aspect, the grant response received by the receiving unit includes an operation success indication, and further includes a virtual resource management plan that is updated by the second NFVO and that is for the NS LCM operation performed for the first NS instance, and that the processing unit performs virtual resource management for the NS LCM operation based on the grant response includes:

the processing unit performs virtual resource management based on the updated virtual resource management plan for the NS LCM operation performed for the first NS instance.

According to a fourth aspect, an embodiment of this application provides a network functions virtualization orchestrator NFVO, where the NFVO includes a receiving unit, a processing unit, and a sending unit that are sequentially connected, where:

the receiving unit is configured to receive an NS LCM operation grant request sent by a first NFVO, where the grant request carries an identifier of a first NS instance and a type of an NS LCM operation, and the first NS instance managed by the first NFVO is a member of a second NS instance managed by the NFVO;

the processing unit is configured to determine, based on the identifier of the first NS instance, the type of the NS LCM operation, and a virtual resource view of the second NS instance managed by the NFVO, whether the NS LCM operation performed for the first NS instance affects the NS instance managed by the NFVO; and the sending unit is configured to send a grant response to the first NFVO based on a determining result.

In a first implementation of the fourth aspect, the processing unit further determines, based on at least one piece of the following locally stored information, whether the NS LCM operation performed for the first NS instance affects the NS instance managed by the NFVO:

a running status of a member NS instance that is of the second NS instance managed by the NFVO and that has a dependency relationship with the first NS instance, and/or a running status of a member VNF instance that is of the second NS instance and that has a dependency relationship with the first NS instance;

an affinity and/or anti-affinity rule that is defined under the second NS instance managed by the NFVO and that is associated with the first NS instance; and a grant policy for an NS LCM operation performed for the second NS instance.

In a second implementation according to the fourth aspect or the first implementation of the fourth aspect, the grant request received by the receiving unit further includes: a virtual resource management plan for the NS LCM operation performed for the first NS instance, where the virtual resource management plan includes:

a type, a quantity, and/or a location of a virtual resource that needs to be added, deleted, or modified for the NS LCM operation with reference to a status of a current resource used by the first NS instance; or a type, a quantity, and/or a location of a virtual resource that is actually occupied in the NS LCM operation by a member VNF instance included in the first NS instance, and/or a type, a quantity, and/or a location of a virtual resource that is actually occupied in the NS LCM operation by a member VL instance included in the first NS instance.

In a third implementation according to the second implementation of the fourth aspect, the processing unit is further configured to:

update, based on the virtual resource view of the NS instance managed by the NFVO and at least one piece of the locally stored information, the virtual resource management plan for the NS LCM operation performed for the first NS instance, where the grant response sent by the sending unit includes an operation success indication, and further includes a virtual resource management plan that is updated by the NFVO and that is for the NS LCM operation performed for the first NS instance, to instruct the first NFVO to implement virtual resource management based on the updated virtual resource management plan for the NS LCM operation performed for the first NS instance.

According to a fifth aspect, an NFVO apparatus is provided, including: a memory configured to store computer executable program code, a transceiver, and a processor coupled to the memory and the transceiver, where the program code includes an instruction, and when the processor executes the instruction, the network element performs the following operations: receiving a network service life cycle management operation request, where the NS LCM operation request carries an identifier of a first NS instance and a type of an NS LCM operation;

sending a grant request to a second NFVO based on the NS LCM operation request, to request the second NFVO to permit the first NFVO to perform virtual resource management for the NS LCM operation performed for the first NS instance, where the grant request carries the identifier of the first NS instance and the type of the NS LCM operation;

receiving a grant response sent by the second NFVO based on the grant request; and performing, based on the grant response, virtual resource management for the NS LCM operation performed for the first NS instance.

According to a sixth aspect, an NFVO apparatus is provided, including: a memory configured to store computer executable program code, a transceiver, and a processor coupled to the memory and the transceiver, where the program code includes an instruction, and when the processor executes the instruction, the network element performs the following operations: receiving an NS LCM operation grant request sent by a first NFVO, where the grant request carries an identifier of a first NS instance and a type of an NS LCM operation;

determining, based on the identifier of the first NS instance, the type of the NS LCM operation, and a virtual resource view of a second NS instance managed by the second NFVO, whether the NS LCM operation performed for the first NS instance affects the second NS instance managed by the second NFVO; and sending a grant response to the first NFVO based on a determining result.

According to a seventh aspect, a computer program product is provided, including executable program code, where the program code includes an instruction, and when the processor executes the instruction, the network element performs the following operations: receiving a network service life cycle management operation request, where the NS LCM operation request carries an identifier of a first NS instance and a type of an NS LCM operation;

sending a grant request to a second NFVO based on the NS LCM operation request, to request the second NFVO to permit the first NFVO to perform virtual resource management for the NS LCM operation performed for the first NS instance, where the grant request carries the identifier of the first NS instance and the type of the NS LCM operation;

receiving a grant response sent by the second NFVO based on the grant request;

and performing, based on the grant response, virtual resource management for the NS LCM operation performed for the first NS instance.

According to an eighth aspect, a computer program product is provided, including executable program code, where the program code includes an instruction, and when the processor executes the instruction, the network element performs the following operations: receiving an NS LCM operation grant request sent by a first NFVO, where the grant request carries an identifier of a first NS instance and a type of an NS LCM operation;

determining, based on the identifier of the first NS instance, the type of the NS LCM operation, and a virtual resource view of a second NS instance managed by the second NFVO, whether the NS LCM operation performed for the first NS instance affects the second NS instance managed by the second NFVO; and sending a grant response to the first NFVO based on a determining result.

According to a ninth aspect, an embodiment of this application provides a computer storage medium, configured to store a computer software instruction used by the foregoing NFVO, where the computer storage medium includes a program designed for executing the foregoing aspects.

According to the nested NS life cycle management grant method in the embodiments of this application, a grant management mechanism is used between the first NFVO and the second NFVO, to implement target consistency between resource management in the nested NS LCM operation and resource management in the life cycle management operation performed for the composite NS to which the nested NS belongs, so as to avoid adverse impact of the resource management performed in the nested NS LCM operation on the composite NS instance.

DESCRIPTION OF EMBODIMENTS

Embodiments of this application provide a nested network service life cycle management grant method and an apparatus, to resolve a prior-art technical problem of a target conflict in life cycle management of a nested network application and a composite network application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, the terms "first" and "second" in this specification are merely for ease of description, used to distinguish between different NSs, NS instances, VNFs, or different VNF instances, and do not have technical meanings.

The following describes the implementations of this application in detail with reference to accompanying drawings.

For differentiation of names, in the embodiments of this application, an NFVO managing a composite NS is referred to as a second NFVO, and an NFVO managing a nested NS is referred to as a first NFVO.

Figure 1:
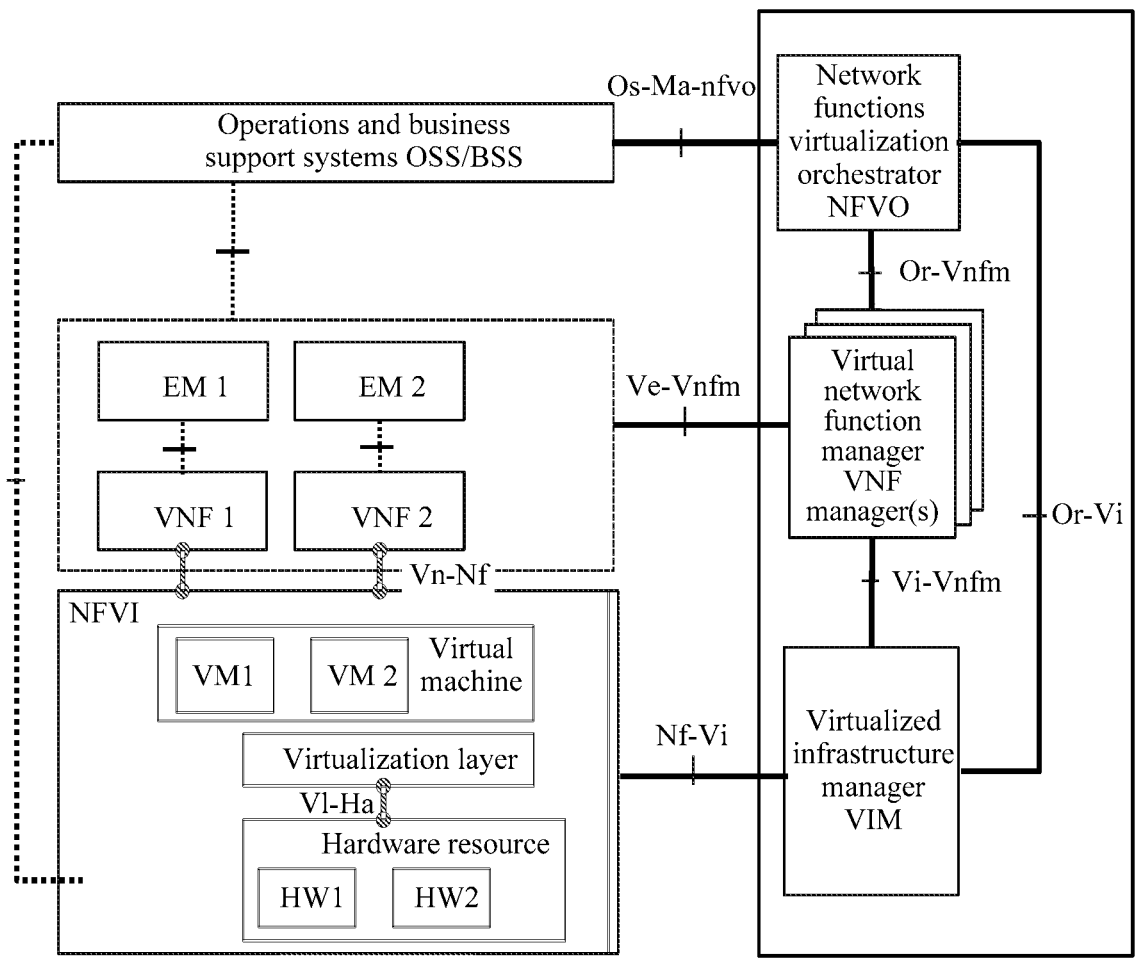
FIG. 1 is a diagram of an NFV-MANO network architecture applied to an embodiment of this application.
Figure 2:
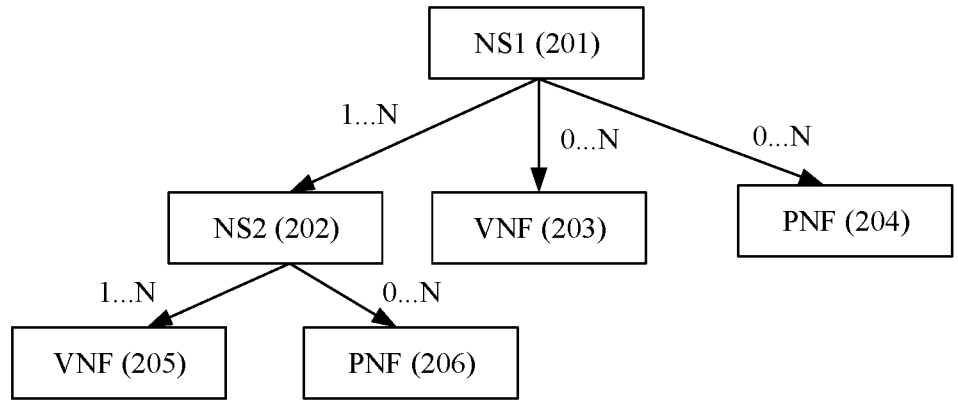
FIG. 2 is a topology diagram of a relationship between a composite network service and a nested network service in an application scenario according to an embodiment of this application.

For example, a telecommunications operator having a large quantity of users provides a vEPC network service. It is assumed that a network of the telecommunications operator is in a two-level structure, including one corporate network and 30 provincial networks, and each subsidiary network has its own management domain and is configured with one NFVO. In this scenario, an NFVO in the corporate network is equivalent to an NFVO managing an NS1 in FIG. 2, namely, a second NFVO, and an NFVO in each provincial network is equivalent to an NFVO managing an NS2 in FIG. 2, namely, a first NFVO. When the telecommunications operator determines to provide the network service vEPC at the corporate network layer, the telecommunications operator may specify that a subsidiary network of a province A provides a control plane network service included in the vEPC, a subsidiary network of a province B provides a user plane network service included in the vEPC, and a subsidiary network of a province C provides a policy control network service included in the vEPC.

Solutions of this application are applicable to granting of the second NFVO for resource management when the first NFVO performs a nested network service (Nested NS) life cycle management operation in a scenario of providing a composite NS across management domains. The second NFVO and the first NFVO respectively manage virtual resource views of the composite NS and the nested NS within the second NFVO and the first NFVO. A virtual resource view is a data structure in an NFVO, is used to present a status of a virtual resource used by an NS instance, and may be expressed as a type (computing, storage, and network) and a quantity of a virtual resource occupied by a member VNF instance and a member VL instance that are included in the NS instance, and location information of a virtual resource of the member VNF instance. In the virtual resource location information, a combination of a VIM identifier, a resource zone identifier, and/or a host identifier may be used to represent a virtual resource location association relationship of different granularities.

The embodiments of this application are applicable to the following two scenarios.

Figure 3:
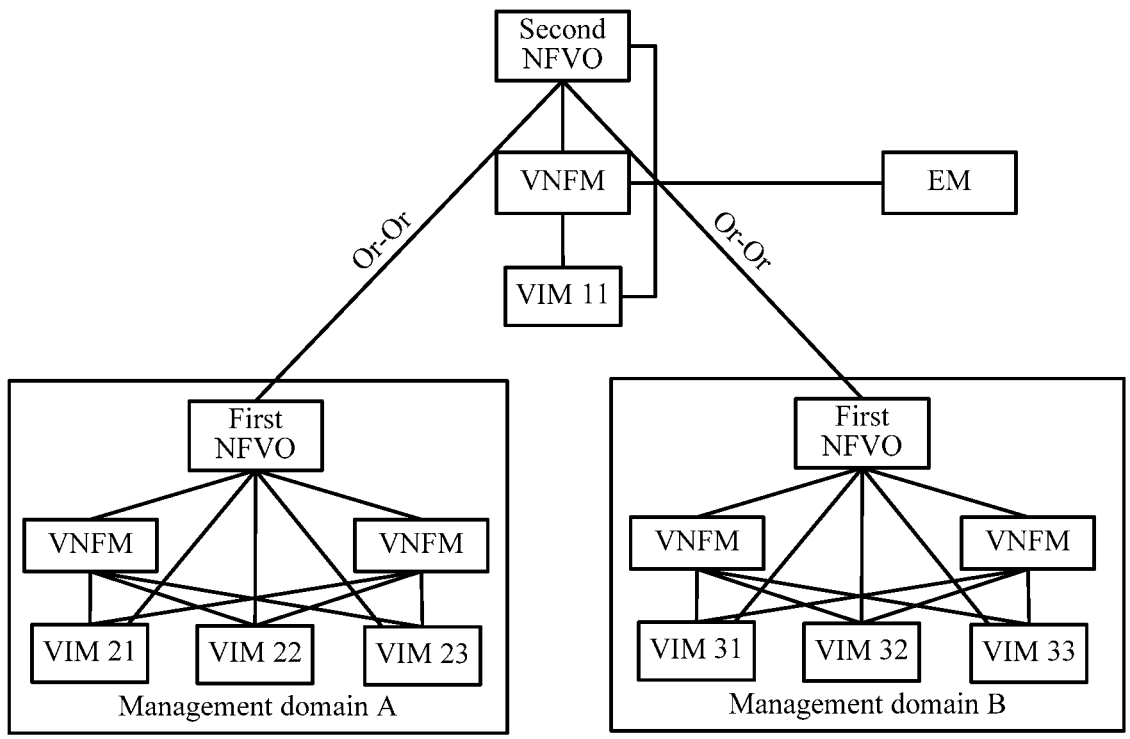
FIG. 3 is a diagram of a network topology in an application scenario 1 according to an embodiment of this application.

Scenario 1: VIMs and NFVI resources in management domains of a composite NS and a nested NS are different from each other. As shown in FIG. 3, VIMs in management domains in the scenario of providing a composite NS across management domains are different from each other.

In this scenario, because VIMs in management domains are different from each other, resource management between life cycle management for a composite NS instance and life cycle management for a nested NS instance does not overlap in target virtual resource space, and resource management between life cycle management for two different nested NS instances does not overlap in target virtual resource space. Therefore, virtual resource allocation or release for each NS instance, regardless of a composite NS instance or a nested NS instance, may be independently completed by an NFVO in each management domain. In a grant process, a second NFVO helps a first NFVO determine actual impact of a nested NS instance LCM operation on a current composite NS instance LCM operation. If an execution target conflict occurs, the second NFVO prohibits the first NFVO from executing the nested NS instance LCM operation.

Figure 4:
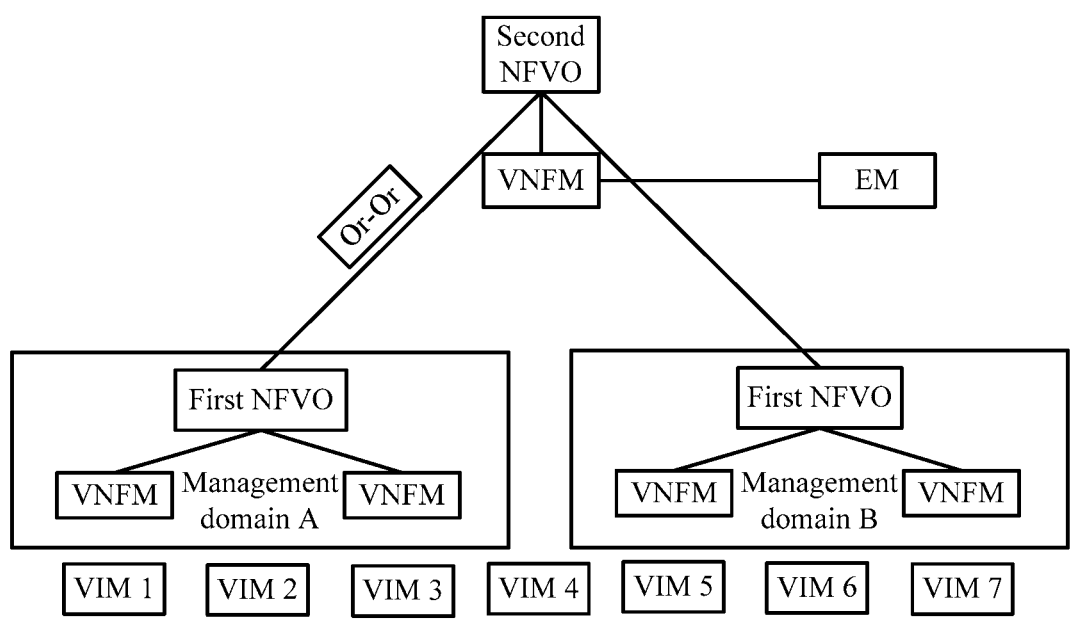
FIG. 4 is a diagram of a network topology in an application scenario 2 according to an embodiment of this application.

Scenario 2: VIMs and NFVI resources in management domains of a composite NS and a nested NS are shared. As shown in FIG. 4, a management domain includes one NFVO and one or more VNFMs managed by the NFVO, and different management domains share a same group of VIMs and NFVI resources in VIM domains.

Compared with the scenario 1, in a nested NS LCM operation grant process, a second NFVO not only needs to determine impact of a nested NS LCM operation on a composite NS instance LCM operation, but also needs to determine, according to an affinity/anti-affinity rule of a member nested NS instance and a member VNF instance of the composite NS instance, a location requirement for a resource that needs to be allocated to the nested NS instance LCM operation, and feeds back a suggested to-be-allocated resource location to a first NFVO. The affinity/anti-affinity rule is used to determine whether two member VNF instances can be deployed in a virtual resource at a same location.

Figure 5:
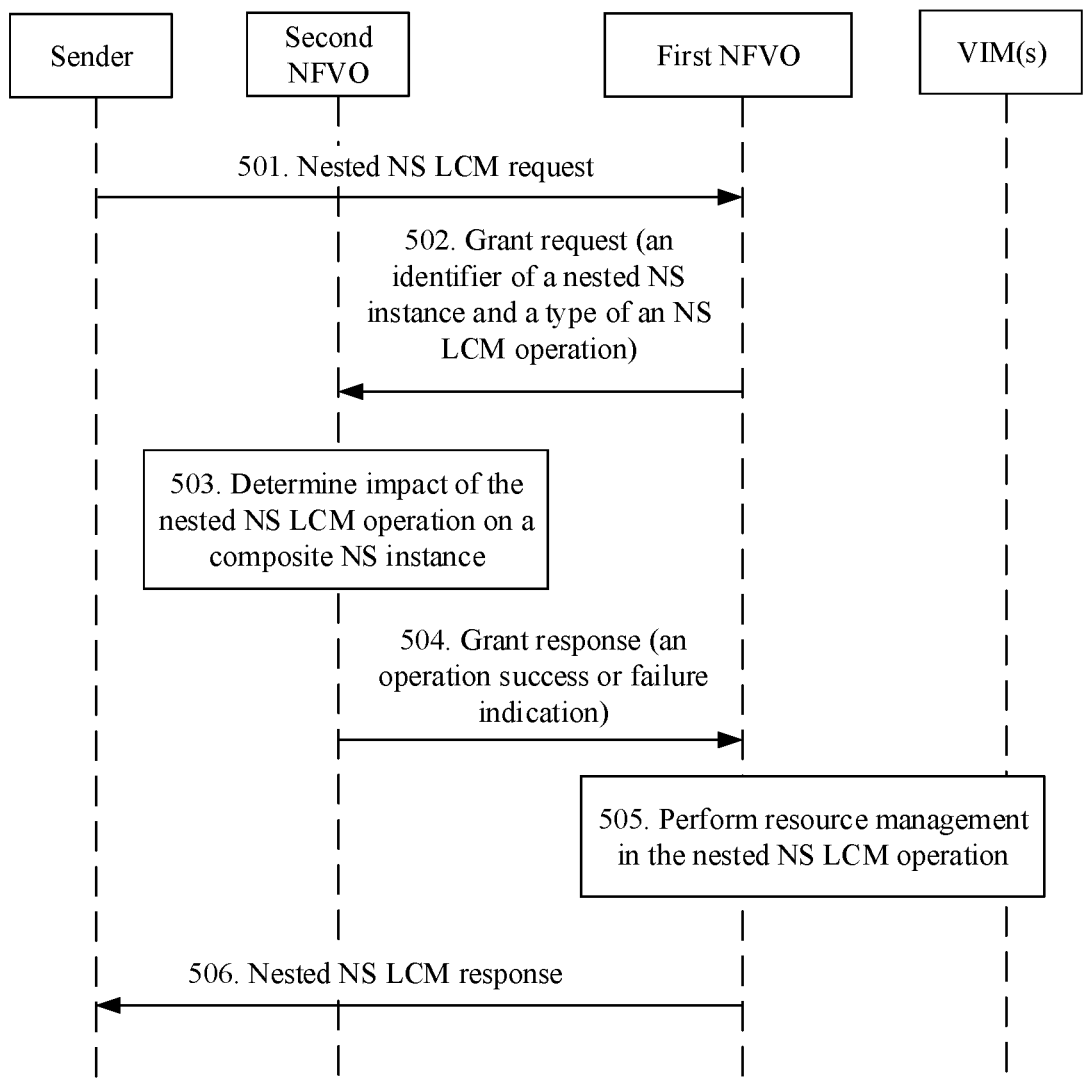
FIG. 5 is an interaction flowchart of a nested network service life cycle management grant method based on an application scenario 1 according to an embodiment of this application.

Embodiment 1 of this application provides a nested NS LCM operation grant method based on the scenario 1, as shown in FIG. 5.

Before execution of the method in this embodiment, the following information needs to be configured. Before a sender sends a request message for a nested NS LCM operation to a first NFVO, the first NFVO has internally stored identification information of a tenant (Tenant ID) that invokes the nested NS instance LCM operation. The tenant identification information may be transferred by a second NFVO to the first NFVO in a composite NS descriptor file on-board process. The tenant identification information may be identification information of the second NFVO, and the identification information is used by the first NFVO for addressing the second NFVO. In addition, the second NFVO and the first NFVO respectively store a virtual resource view of a composite NS instance and a virtual resource view of a nested NS instance. The virtual resource view of the composite NS instance does not include the virtual resource view of the nested NS instance. In other words, the virtual resource view of the nested NS instance is invisible to the second NFVO.

As shown in FIG. 5, the nested NS LCM operation grant method in this embodiment includes the following steps.

501. A sender sends a nested NS LCM operation request message to a first NFVO, where the request message carries identification information of a nested NS instance and a type of an NS LCM operation.

Specifically, the type of the NS LCM operation may include but is not limited to NS instantiation, NS scaling, NS update, NS healing, and NS termination. For a definition of an input parameter in the request message, refer to the ETSI NFV IFA013 protocol.

502. The first NFVO addresses a second NFVO based on tenant identification information (Tenant ID) stored inside the first NFVO, and sends a grant request to the second NFVO, where the request message carries the identification information of the nested NS instance and the type of the executed NS LCM operation.

Specifically, the first NFVO stores a correspondence between the tenant identification information and the identification information of the nested NS instance. The first NFVO may find the stored tenant identification information based on the identification information of the nested NS instance in the received nested NS LCM request, then search for identification information, such as an IP address, of the second NFVO based on the tenant identification information, and sends the grant request to the second NFVO based on the identification information of the second NFVO.

503. The second NFVO checks the type of the nested NS instance LCM operation in the received grant request, and determines, based on the identification information of the nested NS instance, the type of the NS LCM operation, and a virtual resource view of an NS instance managed by the second NFVO, whether the nested NS LCM operation affects the NS instance managed by the second NFVO.

Specifically, the second NFVO determines, based on the virtual resource view of the NS instance managed by the second NFVO, whether there is a VNF instance and/or a nested NS instance in a composite NS instance that have/has a dependency relationship with the nested NS instance in the LCM operation, and whether the VNF instance and the nested NS instance are performing the LCM operation in which the dependency relationship exists, to determine whether the nested NS LCM operation affects the NS instance managed by the second NFVO. The dependency relationship is used to determine a sequence of virtual resource allocation between two member instances (which may be nested NS instances or VNF instances) of the composite NS instance. For example, resource allocation of a nested NS instance performing a life cycle management operation in an LCM operation depends on completion of resource allocation to another member VNF instance and/or nested NS instance in the corresponding LCM operation.

Further, the second NFVO can determine, based on a corresponding nested NS LCM grant policy, whether to permit the first NFVO to perform virtual resource management for the nested NS LCM operation. For example, the nested NS LCM grant policy specifies that when load of the composite NS instance is relatively light, resource management requests of all member nested NS instances may be satisfied as much as possible; and if the load of the composite NS instance is relatively heavy, a resource management request of a member nested NS instance with a high priority is preferentially satisfied.

The nested NS LCM grant policy may be sent to the second NFVO through preconfiguration or in an operation manner of configuring policy information by an OSS/BSS on an Os-Ma-nfvo interface.

504. The second NFVO sends a grant response to the first NFVO based on a determining result.

If the second NFVO determines that there is no impact, the second NFVO permits the first NFVO to perform virtual resource management corresponding to the nested NS LCM operation, and the second NFVO returns a grant response message to the first NFVO, where the message carries an operation success indication. If the second NFVO determines that there is impact, the second NFVO returns a grant response message carrying a failure reason indication to the first NFVO.

505. The first NFVO interacts with a corresponding VIM based on a grant in a grant response message, to perform virtual resource management for the nested NS LCM operation.

Specifically, the first NFVO interacts, based on grant indication information in the grant response message, with the VIM corresponding to the first NFVO, to perform a virtual resource management operation such as virtual resource allocation or release for the nested NS LCM operation.

506. The first NFVO returns a nested NS LCM operation execution result to the sender by using a nested NS LCM response message.

According to the nested NS life cycle management grant method in this embodiment of this application, a grant management mechanism is used between the first NFVO and the second NFVO, to implement target consistency between resource management in the nested NS LCM operation and resource management in a life cycle management operation performed for a composite NS to which a nested NS belongs, so as to avoid adverse impact of resource management performed in the nested NS LCM operation on the composite NS instance.

Figure 6:
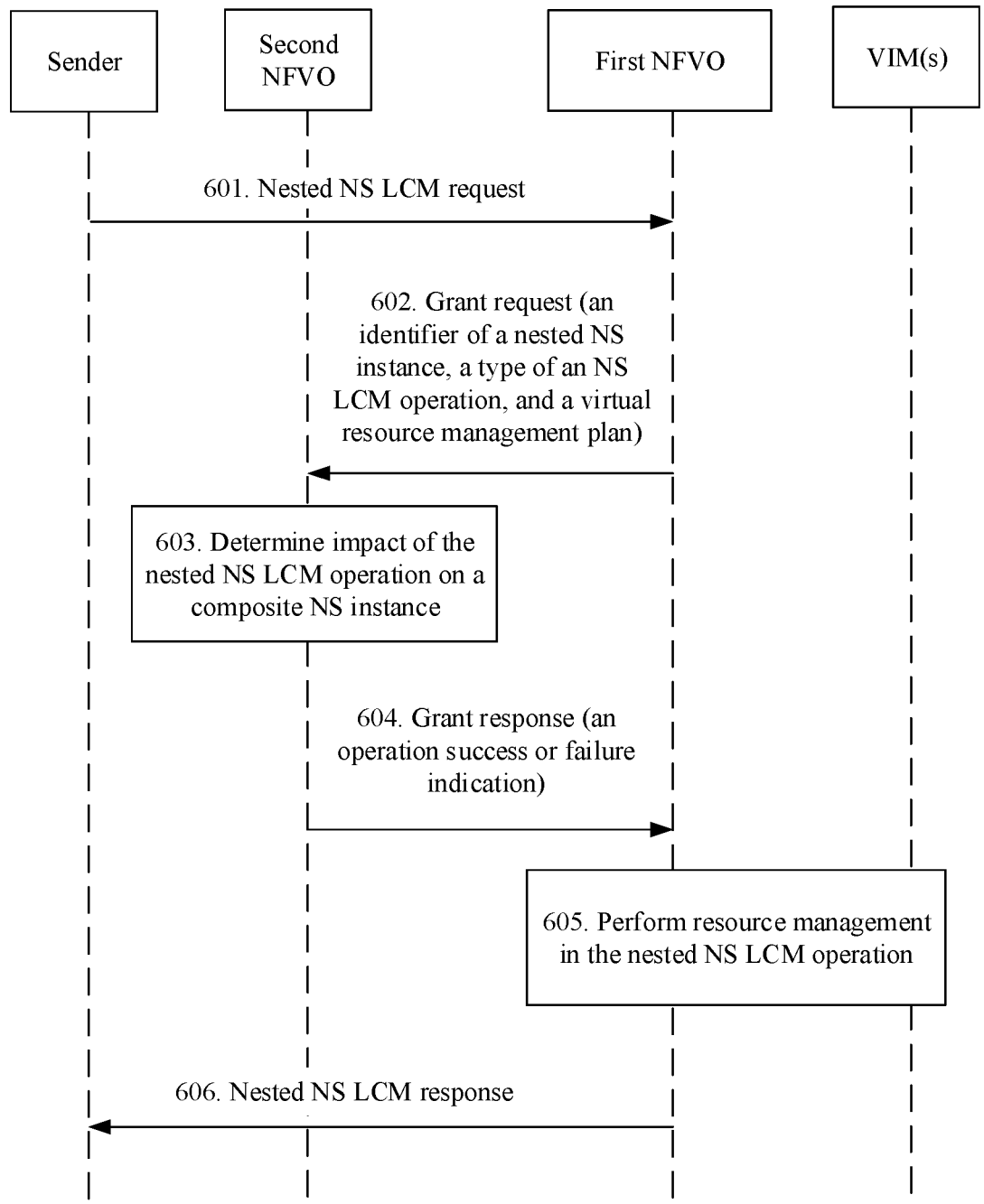
FIG. 6 is an interaction flowchart of a nested network service life cycle management grant method based on an application scenario 2 according to an embodiment of this application.

Embodiment 2 of this application provides a method for granting a nested NS LCM operation by a second NFVO based on a scenario 2, as shown in FIG. 6.

This embodiment describes a basic schematic process of a grant process of performing a nested NS LCM operation in the scenario 2.

Before execution of the process in this embodiment, the following configuration needs to be performed. Before a sender sends a request message for a nested NS LCM operation to a first NFVO, the first NFVO has internally stored identification information of a tenant (Tenant ID) that invokes the nested NS instance LCM operation. The tenant identification information may be transferred by a second NFVO to the first NFVO in an on-board process of a composite NS descriptor file. The tenant identification information herein may be identification information of the second NFVO, and the identification information is used by the first NFVO for addressing the second NFVO for interaction. In addition, the second NFVO and the first NFVO respectively store a virtual resource view of a composite NS instance and a virtual resource view of a nested NS instance. The virtual resource view of the composite NS instance includes the virtual resource view of the nested NS instance. In other words, the virtual resource view of the nested NS instance is visible to the second NFVO.

As shown in FIG. 6, this embodiment includes the following steps.

601. A sender sends a nested NS LCM operation request message to a first NFVO, where the request message carries a type of an operation and identification information of a nested NS instance.

The type of the NS LCM operation may include but is not limited to NS instantiation, NS scaling, NS update, NS healing, and NS termination. For a definition of an input parameter in the operation, refer to the ETSI NFV IFA013 protocol.

602. The first NFVO addresses a second NFVO based on tenant identification information (Tenant ID) stored inside the first NFVO, and sends a grant request to the second NFVO, where the request message carries the identification information of the nested NS instance, the type of the executed NS LCM operation, and a virtual resource management plan for the NS LCM operation.

Specifically, the first NFVO determines the virtual resource management plan for the NS LCM operation based on the type of the NS LCM operation in the request, and a virtual resource view of a nested NS instance managed inside the first NFVO. To be specific, the first NFVO determines, based on a current virtual resource allocation status of the nested NS instance, a quantity and a location of a virtual resource that needs to be added, deleted, or modified; or a type, a quantity, and/or a location of a virtual resource that is actually occupied in the NS LCM operation by a member VNF instance included in the nested NS instance, and/or a type, a quantity, and/or a location of a virtual resource that is actually occupied in the NS LCM operation by a member VL instance included in the nested NS instance. For a manner of addressing the second NFVO, refer to step 502 in FIG. 5.

603. The second NFVO determines whether the nested NS LCM operation affects another nested NS instance or an NFV instance managed by the second NFVO.

Specifically, the second NFVO checks the virtual resource management plan in the received grant request, checks, based on a resource view of a composite NS managed by the second NFVO, whether there is a resource management conflict between another member VNF instance or member nested NS instance in the composite NS instance and the nested NS instance LCM operation, and determines whether to permit the virtual resource management plan formulated by the first NFVO for the nested NS LCM operation.

Specifically, the second NFVO may determine whether there is a VNF instance and/or nested NS instance in the composite NS instance that have/has a dependency relationship with the nested NS instance in the life cycle management operation, for example, resource allocation of a nested NS instance performing a life cycle management operation in an LCM operation depends on completion of resource allocation to another member VNF instance and/or nested NS instance in the corresponding LCM operation; and whether the VNF instance and the nested NS instance are performing the LCM operation in which the dependency relationship exists.

Further, the second NFVO can further determine, based on a corresponding nested NS LCM grant policy, whether to permit the virtual resource management plan formulated by the first NFVO for the nested NS LCM operation.

604. The second NFVO sends a grant response to the first NFVO based on a determining result.

If the second NFVO determines that the virtual resource management plan is permitted, the second NFVO returns a grant response message to the first NFVO, where the message carries an operation success indication. The second NFVO further updates the virtual resource view of the composite NS instance based on the virtual resource management plan. If the second NFVO determines that the virtual resource management plan is not permitted, the second NFVO returns a grant response message carrying a failure reason indication to the first NFVO.

In an optional solution, the second NFVO can further adjust, based on at least one of the following conditions, the virtual resource management plan formulated by the first NFVO for the nested NS LCM operation, and returns the updated virtual resource management plan to the first NFVO by using the grant response message, for example, the resource view of the composite NS managed by the second NFVO, a status of performing an operation by the VNF instance that is in the composite NS instance and that has a dependency relationship with the nested NS instance in the life cycle management operation, a status of performing an operation by another nested NS instance that is in the composite NS instance and that has a dependency relationship with the nested NS instance in the life cycle management operation, and the corresponding nested NS LCM grant policy.

605. The first NFVO interacts with a corresponding VIM based on the virtual resource management plan, to perform virtual resource management for the nested NS LCM operation.

For a specific implementation of this step, refer to the implementation of step 505 in FIG. 5.

606. The first NFVO returns a nested NS LCM operation execution result to the sender by using a nested NS LCM response message.

Embodiment 3 of this application provides a method for granting resource management in a nested NS instantiation operation by a second NFVO based on a scenario 2. This embodiment is a specific instance of Embodiment 2 and is applied to a nested NS instantiation process.

701. A sender, which may be an OSS/BSS, sends a nested NS instantiation request message to a first NFVO, where the request message carries an identifier of an NS instance and a resource requirement description parameter.

The nested NS instantiation request may further include a flavor identifier (Flavor ID) reflecting a specific topology of a nested NS, constraint information of a deployment location of a member VNF instance of a nested NS instance, and the like.

702. The first NFVO addresses a second NFVO based on the nested NS instantiation request, and sends a grant request to the second NFVO.

Specifically, before sending the grant request, the first NFVO parses input parameters in the nested NS instantiation request, and forms, based on the resource requirement description, such as a basic virtual resource requirement corresponding to an NS instantiation class, of the nested NS instance in an NS instantiation operation in the request message, a resource management plan for the member VNF instance and a member VL instance that are included in the nested NS instance, to be specific, resource occupation information of the member VNF instance and resource occupation information of the member VL instance.

Then, the first NFVO sends the grant request to the second NFVO, where the request message carries the identifier of the nested NS instance, a type of an NS LCM operation (the type of the LCM operation=NS instantiation), the resource occupation information of the member VNF, the resource occupation information of the member VL, and a resource location constraint relationship of the nested NS.

The identifier of the nested NS instance is used to uniquely identify the nested NS instance in the first NFVO. The type of the NS LCM operation is used to indicate a type of an NS life cycle management operation in the grant request. The resource occupation information of the member VNF includes a quantity of virtual resources (computing, storage, and network) required for instantiation of the member VNF that is included in the nested NS instance. The resource occupation information of the member VL includes a quantity of virtual resources (network) required for instantiation of the member VL. The resource location constraint relationship of the nested NS indicates description information of a location limitation for resource management in the nested NS LCM operation, and may be a relative location limitation determined according to an affinity/anti-affinity rule between the member VNF instance and/or the member VL instance. For example, nested NS instantiation needs to be deployed on several adjacent hosts in a same resource zone. The resource location constraint relationship may also be an absolute physical location limitation reflecting deployment of the member VNF instance and/or the member VL instance. For example, nested NS instantiation needs to be deployed within a scope of hosts A1, A2, and A3. A resource location may be represented by a VIM identifier, a resource zone identifier, and/or a host identifier.

703. The second NFVO determines, based on the grant request sent by the first NFVO, whether to permit the first NFVO to perform resource management for an NS instantiation operation, and sends a grant response to the first NFVO.

Specifically, the second NFVO returns the grant response to the first NFVO based on a virtual resource view of a composite NS instance, a dependency relationship between member nested NS instances of the composite NS instance, and/or a corresponding nested NS LCM grant policy, where the grant response message carries an identifier of a VIM that the first NFVO needs to interact with, a resource zone identifier, and/or a host identifier (resource location information). The resource location information is used to indicate a location of a resource that is recommended by the second NFVO and that is required for performing a life cycle management operation of this type for the nested NS instance.

The second NFVO may further add, to the response message, information about an actual resource allocated for the nested NS instantiation operation in each VIM, for example, a quantity of actually allocated virtual resources (computing, storage, and network) required for instantiation of the member VNF of the nested NS instance, and a quantity of virtual resources (network) actually allocated for member VL instantiation.

704. The first NFVO interacts with a corresponding VIM based on information provided in the grant response, to implement resource management in nested NS instance life cycle management.

Specifically, the first NFVO interacts with the corresponding VIM based on the VIM identifier, the resource zone identifier, and/or the host identifier in the grant response, and perform resource allocation based on the quantity of actually allocated virtual resources (computing, storage, and network) required for instantiation of the member VNF of the nested NS instance, and the quantity of virtual resources (network) actually allocated for member VL instantiation.

705. The first NFVO returns a nested NS instantiation response to the sender, to indicate completion of the nested NS instantiation operation.

Figure 8:
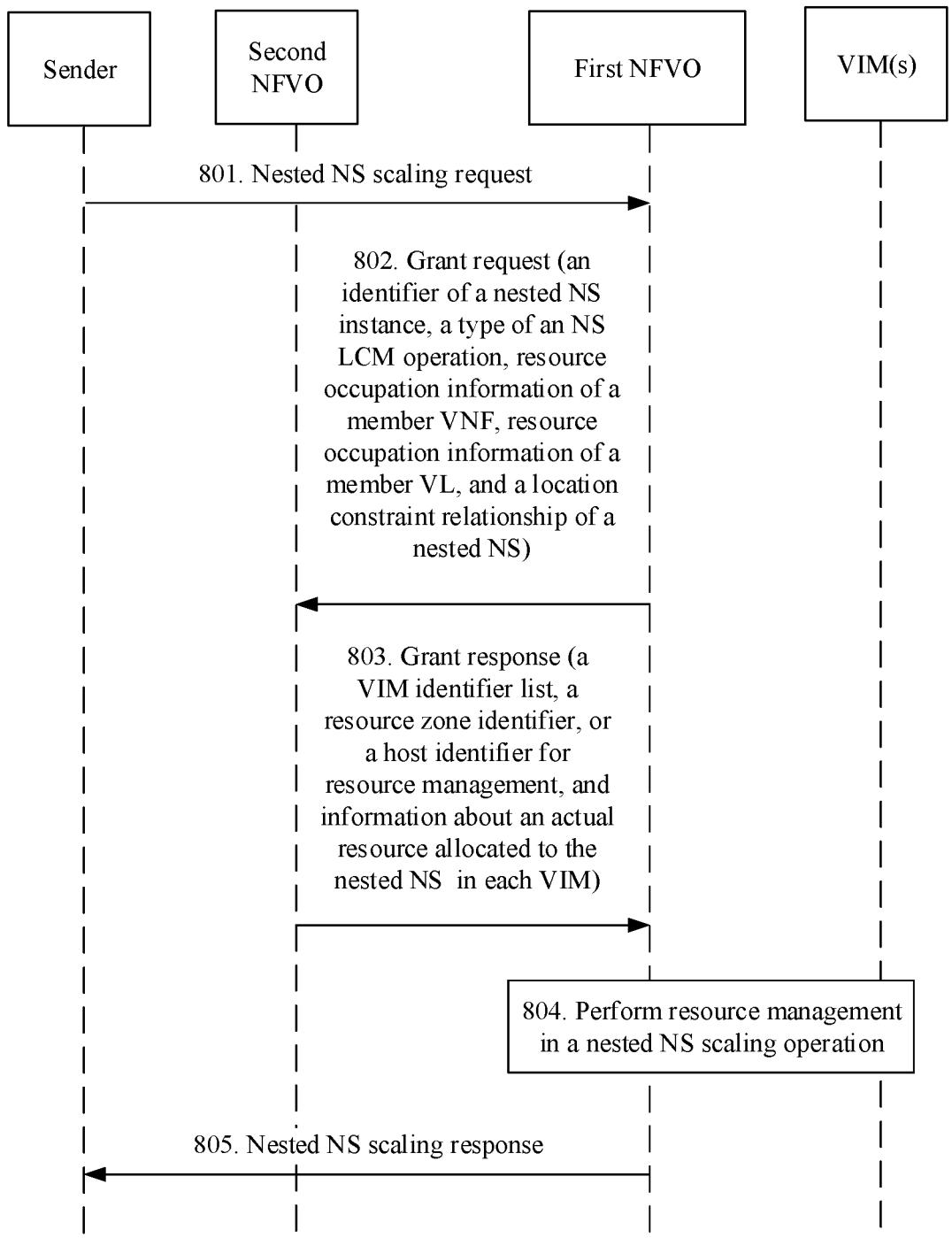
FIG. 8 is an interaction flowchart of a nested network service scaling operation grant method based on an application scenario 2 according to an embodiment of this application.

Embodiment 4 of this application provides a method for granting resource management in nested NS scaling by a second NFVO based on the scenario 2, as shown in FIG. 8.

Figure 7:
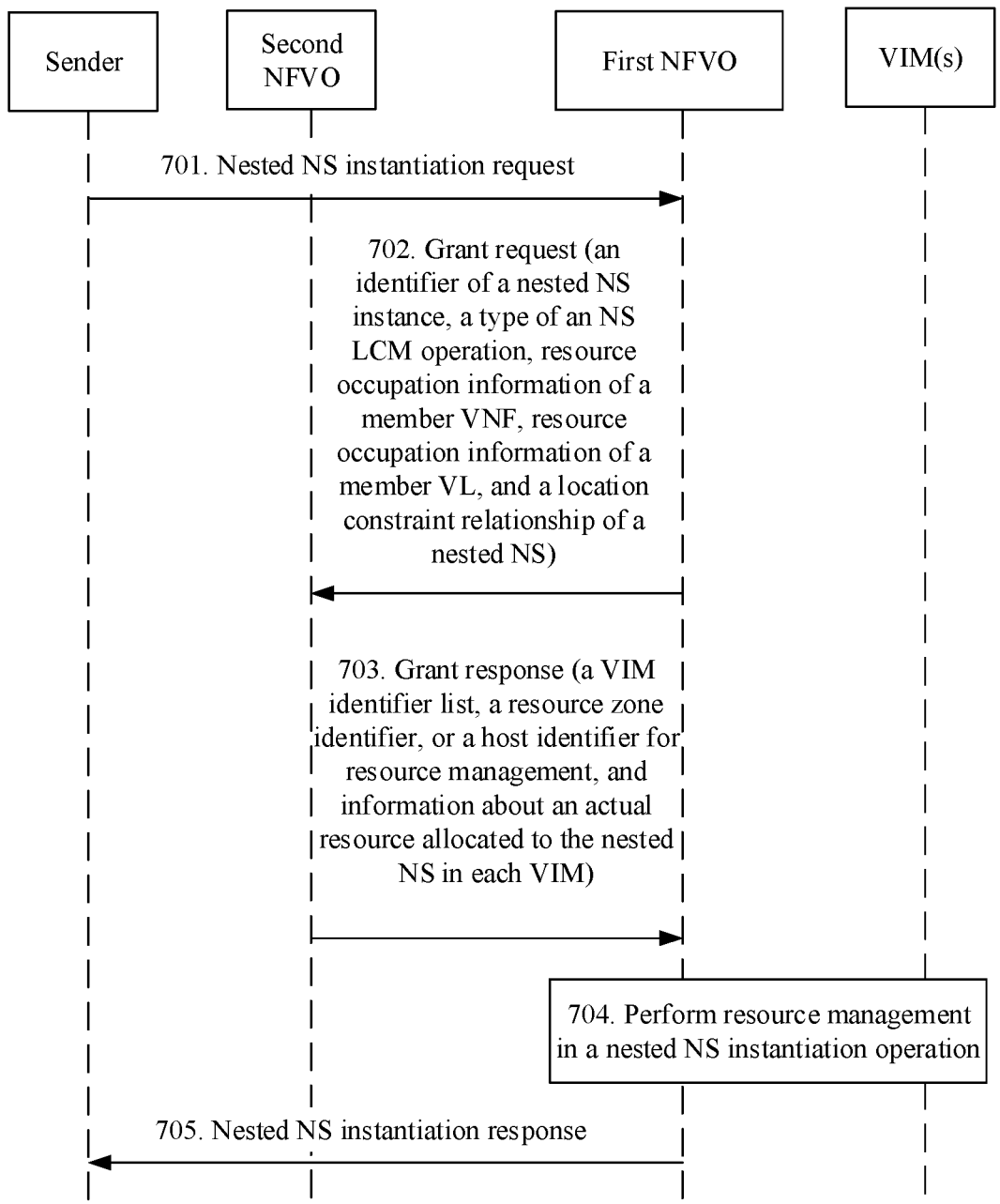
FIG. 7 is an interaction flowchart of a nested network service instantiation operation grant method based on an application scenario 2 according to an embodiment of this application.

This embodiment is a specific instance of Embodiment 2, and is applied to a nested NS scaling operation process. Steps of this embodiment are similar to those of Embodiment 3. A difference lies in that a type of an NS LCM operation in input parameters in steps 801 and 802 is "NS scaling". In step 802, resource occupation information of a member VNF reflects a variation (a quantity of increased or decreased virtual resources) of virtual resources required for performing scaling by a member VNF instance in a scaling operation of a nested NS instance, and resource occupation information of a member VL reflects a variation of virtual resources required for performing scaling by a member VL instance in the scaling operation of the nested NS instance. For specific implementations of other steps, refer to descriptions of Embodiment 3 in FIG. 7.

Figure 9:
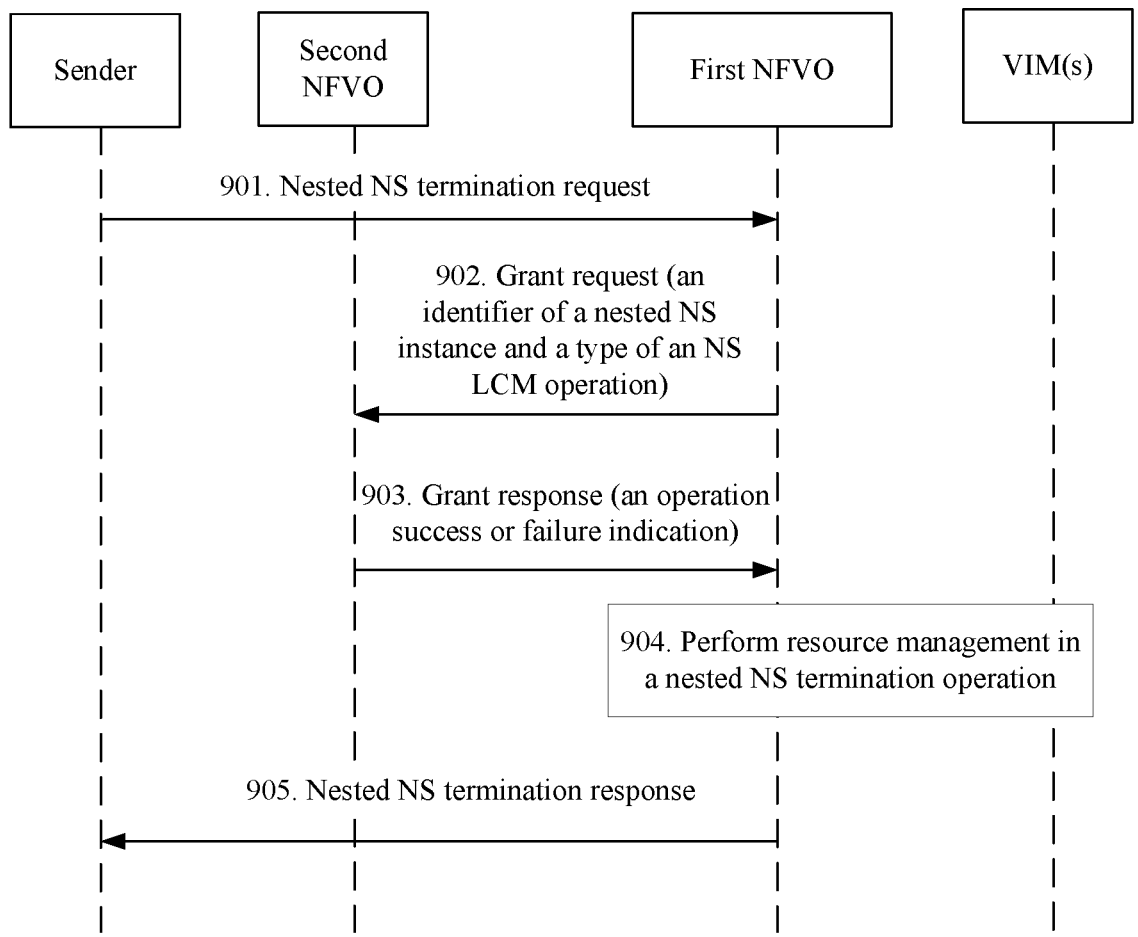
FIG. 9 is an interaction flowchart of a nested network service termination operation grant method based on an application scenario 2 according to an embodiment of this application.

Embodiment 5 of this application provides a method for granting resource management in nested NS termination by a second NFVO based on the scenario 2, as shown in FIG. 9.

This embodiment is a specific instance of Embodiment 2 and is applied to a nested NS termination process. Compared with Embodiment 3, in this embodiment, a type of an NS LCM operation in input parameters in steps 901 and 902 is "NS termination". In step 902, input parameters such as resource occupation information of a member VNF, resource occupation information of a member VL, and a location constraint relationship of a nested NS are null. In step 903, a grant response message carries only an operation success indication or an operation failure indication.

Figure 10:
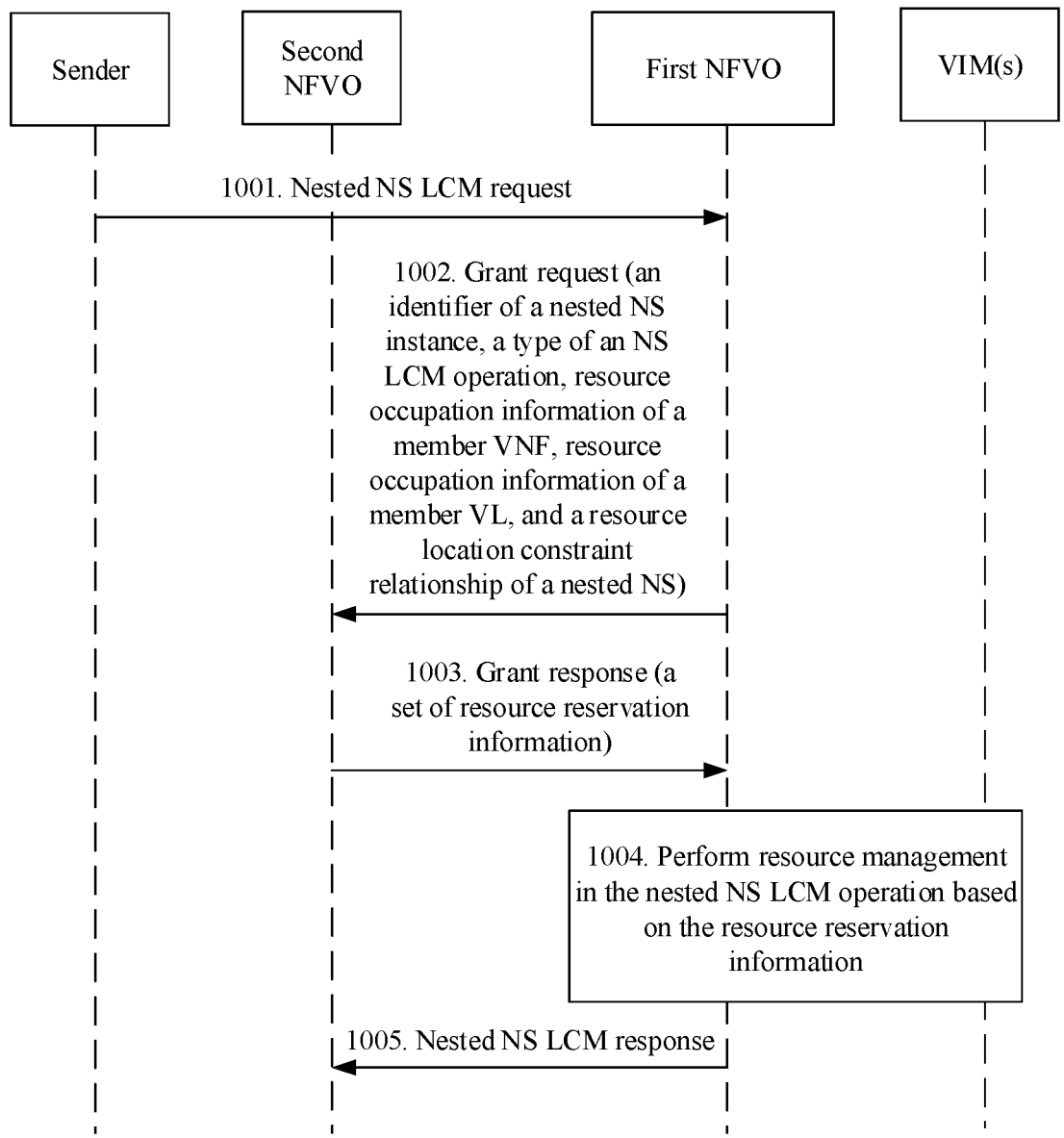
FIG. 10 is an interaction flowchart of a resource reservation operation grant method in nested network service life cycle management based on an application scenario 2 according to an embodiment of this application.

Embodiment 6 of this application provides a method for reserving a resource in nested NS LCM by a second NFVO based on the scenario 2, as shown in FIG. 10.

A process of this embodiment is similar to that of Embodiment 2. Other steps are not described again except step 1003. In step 1003, a second NFVO returns a set of resource reservation information in a grant response. Each piece of resource reservation information includes an identifier of resource reservation, and a quantity and a location of a resource included in the resource reservation. A resource location includes identification information of a VIM that needs to perform interaction, identification information of a resource zone, or identification information of a host. A resource quantity indicates a quantity of virtual computing, storage, and/or network resources reserved at the resource location. Optionally, the resource reservation information may further include a VNF type or a VL type adapted to the resource reservation.

In this embodiment, when a first NFVO and a VIM specified in the resource reservation information perform resource management in step 1004, a result of the resource management is always successful because of resource reservation by the second NFVO.

In the nested NS LCM operation grant methods in Embodiment 1 to Embodiment 6, the first NFVO may address the second NFVO by using the following method:

When the first NFVO receives an NS instantiation request from a sender and creates and instantiates a new NS instance (a nested NS instance), an identifier of a corresponding second NFVO is set to null. When the second NFVO needs to instantiate a composite NS instance and obtains the successfully instantiated nested NS instance through subscription to form the composite NS instance to be instantiated, the second NFVO sends a notification message to the first NFVO, to indicate that the second NFVO uses the nested NS instance managed by the first NFVO in a composite NS instantiation process. The first NFVO stores a correspondence between an identifier of the nested NS instance identity and the identifier of the second NFVO. When the second NFVO terminates the composite NS instance, the second NFVO sends a notification message to the first NFVO that manages the nested NS instances, to instruct the first NFVO to delete the correspondence between the identifier of the nested NS instance and the identifier of the second NFVO based on the notification message. The identifier of the second NFVO may be a tenant identifier. It should be noted that at a same moment, only one second NFVO can apply the nested NS instances to a composite NS instance managed by the second NFVO. In this case, the first NFVO can find an identifier of the second NFVO based on the identifier of the nested NS instance in a nested NS LCM request and a correspondence between the identifier of the nested NS instance and the identifier of the second NFVO, so as to send a grant request to the second NFVO.

Figure 11:
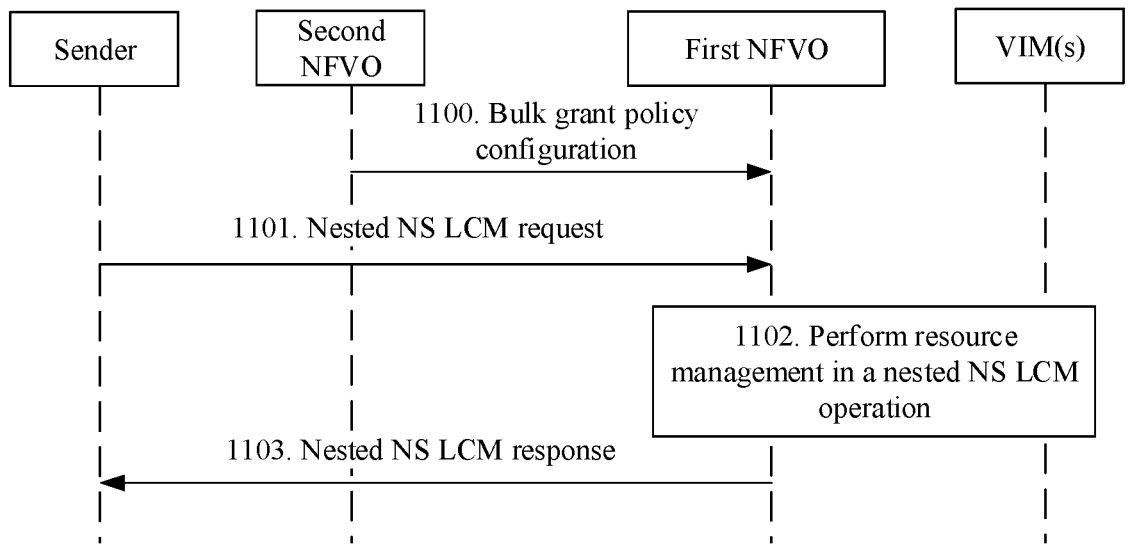
FIG. 11 is an interaction flowchart of a bulk grant method in nested network service life cycle management according to another embodiment of this application.

Embodiment 7 of this application provides a method for autonomously performing resource management in a nested NS LCM operation by a first NFVO, as shown in FIG. 11.

This embodiment is another manner of resource management granting in a nested NS LCM operation. To be specific, with authorization of the first NFVO, bulk granting is implemented through policy configuration. The first NFVO autonomously interacts with a VIM within an authorization scope to execute resource management in a nested NS LCM operation. A second NFVO does not participate in a process of the resource management in the nested NS LCM operation, but may subscribe to notification messages in the resource management from the first NFVO, for example, a message indicating that a resource status changes in the nested NS LCM operation, or a quantity of used resources in the nested NS LCM operation exceeds a resource quota of the first NFVO. The second NFVO updates a bulk grant policy based on a received notification message that the second NFVO subscribes to, and controls, based on a virtual resource view of a composition NS, consistency of autonomously performing resource management in nested NS LCM by the first NFVO. This embodiment includes the following steps.

1100. A second NFVO configures a bulk grant policy for a first NFVO.

This step may be understood as a necessary prerequisite for autonomously performing resource management in a nested NS LCM operation by the first NFVO. The bulk grant policy configured by the second NFVO includes but is not limited to: a resource location constraint (including a group of limited VIM identifiers, resource zone identifiers, or host identities) for performing resource management by the first NFVO, a resource quota of the first NFVO in a plurality of VIM domains that support addressing for resource management, a validity time and/or a failure time of a bulk granting process, and the like.

1101. The first NFVO receives a nested NS LCM request sent by a sender, where the request message carries a type of an NS LCM operation and identification information of a first NS instance.

For specific implementations, refer to specific descriptions in corresponding steps in Embodiments 3 to 6.

1102. The first NFVO performs resource management in the nested NS LCM operation based on batch grant policy configuration.

1103. The first NFVO returns a nested NS LCM response to the sender.

According to the nested NS LCM operation grant method in this embodiment of this application, the second NFVO preconfigures the grant policy for the first NFVO in bulk, so that the first NFVO can perform the nested NS LCM operation based on the batch grant policy configuration. This avoids interactions in which the first NFVO needs to implement a nested NS LCM grant request/response process with the second NFVO each time, reduces network resource consumption, and improves resource management efficiency for the nested NS LCM operation.

Figure 12:
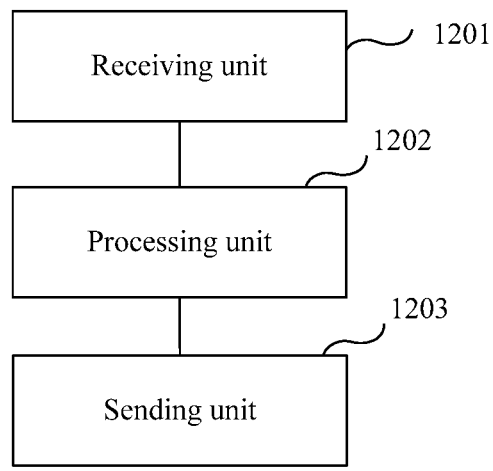
FIG. 12 is a schematic structural diagram of functions of an NFVO according to an embodiment of this application.

Embodiment 8 of this application provides an NFVO apparatus. As shown in FIG. 12, the NFVO apparatus includes: a receiving unit 1201, configured to receive a nested NS LCM operation request, where the nested NS LCM operation request carries an identifier of a first NS instance and a type of an NS LCM operation;

a sending unit 1203, configured to send a grant request to a second NFVO based on the NS LCM operation request, to request the second NFVO to permit the NFVO to perform virtual resource management for the NS LCM operation performed for the first NS instance, where the grant request carries the identifier of the first NS instance and the type of the NS LCM operation, where the receiving unit 1201 is further configured to receive a grant response sent by the second NFVO based on the grant request; and a processing unit 1202, configured to perform, based on the grant response, virtual resource management for the NS LCM operation performed for the first NS instance.

Specifically, the sending unit 1203 locally obtains a stored tenant identifier based on the identifier of the first NS instance, obtains identification information of the second NFVO based on the tenant identifier, and sends the grant request to the second NFVO based on the identification information of the second NFVO.

Specifically, the processing unit 1202 may determine a virtual resource management plan for the nested NS LCM operation based on a local virtual resource view, and send the virtual resource management plan to the second NFVO by using the sending unit 1203. The virtual resource management plan includes: a type, a quantity, and/or a location of a virtual resource that needs to be added, deleted, or modified for the NS LCM operation with reference to a status of a current resource used by the first NS instance; or a type, a quantity, and/or a location of a virtual resource that is actually occupied in the NS LCM operation by a member VNF instance included in the first NS instance, and/or a type, a quantity, and/or a location of a virtual resource that is actually occupied in the NS LCM operation by a member VL instance included in the first NS instance.

Specifically, the grant response received by the receiving unit 1201 includes an operation success indication, and further includes a virtual resource management plan that is updated by the second NFVO and that is for the NS LCM operation performed for the first NS instance, and the processing unit 1202 implements virtual resource management based on the updated virtual resource management plan for the NS LCM operation performed for the first NS instance.

For specific implementations of operations performed by the units included in the NFVO, refer to corresponding steps performed by the first NFVO in Embodiments 1 to 7, and details are not repeated herein.

The NFVO apparatus may be specifically a software product including a computer instruction. When being executed by a processor, the computer instruction is used to implement the steps and functions performed by the first NFVO in Embodiments 1 to 7.

Figure 13:
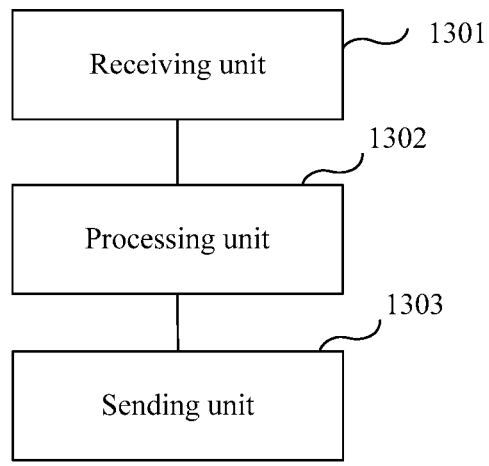
FIG. 13 is a schematic structural diagram of functions of an NFVO according to another embodiment of this application.

Embodiment 9 of this application provides another NFVO apparatus. As shown in FIG. 13, the NFVO apparatus includes:

a receiving unit 1301, configured to receive an NS LCM operation grant request sent by a first NFVO, where the grant request carries an identifier of a first NS instance and a type of an NS LCM operation;

a processing unit 1302, configured to determine, based on the identifier of the first NS instance, the type of the NS LCM operation, and a virtual resource view of a second NS instance managed by the NFVO, whether the NS LCM operation performed for the first NS instance affects the second NS instance managed by the NFVO; and a sending unit 1303, configured to send a grant response to the first NFVO based on a determining result.

The processing unit 1302 further determines, based on at least one piece of the following information, whether the NS LCM operation performed for the first NS instance affects the second NS instance managed by the NFVO:

a running status of a member NS instance that is of the second NS instance managed by the NFVO and that has a dependency relationship with the first NS instance, and/or a running status of a member VNF instance that is of the second NS instance and that has a dependency relationship with the first NS instance;

an affinity and/or anti-affinity rule that is defined under the second NS instance managed by the NFVO and that is associated with the first NS instance; and a grant policy for an NS LCM operation performed for the second NS instance.

Specifically, the grant request received by the receiving unit 1301 further includes:

a virtual resource management plan for the NS LCM operation performed for the first NS instance, where the virtual resource management plan includes: a type, a quantity, and/or a location of a virtual resource that needs to be added, deleted, or modified for the NS LCM operation with reference to a status of a current resource used by the first NS instance; or a type, a quantity, and/or a location of a virtual resource that is actually occupied in the NS LCM operation by a member VNF instance and/or a member VL instance included in the first NS instance.

The processing unit 1302 may further update, based on the virtual resource view of the NS instance managed by the NFVO, the virtual resource management plan for the NS LCM operation performed for the first NS instance, and return the updated virtual resource management plan to the first NFVO by using the sending unit 1303.

For specific implementations of operations performed by the units included in the NFVO, refer to corresponding steps performed by the second NFVO in Embodiments 1 to 7, and details are not repeated herein.

The NFVO apparatus may be specifically a software product including a computer instruction. When being executed by a processor, the computer instruction is used to implement the steps and functions performed by the second NFVO in Embodiments 1 to 7.

Figure 14:
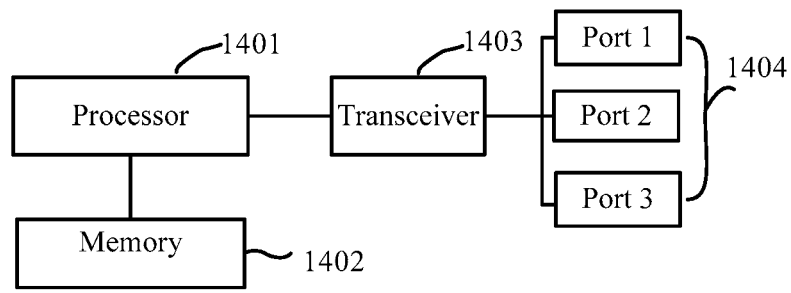
FIG. 14 is a schematic diagram of a general physical structure of an NFVO according to an embodiment of this application.

Embodiment 10 of this application provides a schematic structural diagram of an NFVO, as shown in FIG. 14. The NFVO may include one or more ports 1404, coupled to a transceiver 1403. The transceiver 1403 may be a transmitter, a receiver, or a combination thereof, and sends a data packet to or receives a data packet from another network node through the ports 1404. A processor 1401 is coupled to the transceiver 1403, and is configured to process a data packet. The processor 1401 may include one or more multi-core processors and/or a memory 1402. The processor 1401 may be a general purpose processor, an application-specific integrated circuit (ASIC), or a digital signal processor (DSP).

The memory 1402 may be a non-transitory storage medium, coupled to the processor 1401, and configured to store different types of data. The memory 1402 may include a read-only memory (ROM), a random access memory (RAM), or another type of dynamic storage device capable of storing information and an instruction, or may be a disk memory. The memory 1402 may be configured to store an instruction implementing an NFV system or a related method. It may be understood that an executable instruction is programmed or loaded into at least one of the processor 1401, a cache, or a long-term memory of the NFVO.

In another embodiment, the memory 1402 stores computer executable program code, where the program code includes an instruction, and when the processor 1401 executes the instruction, the network element performs the following operations:

receiving a network service life cycle management operation request, where the NS LCM operation request carries an identifier of a first NS instance and a type of an NS LCM operation;

sending a grant request to a second NFVO based on the NS LCM operation request, to request the second NFVO to permit the first NFVO to perform virtual resource management for the NS LCM operation performed for the first NS instance, where the grant request carries the identifier of the first NS instance and the type of the NS LCM operation;

receiving a grant response sent by the second NFVO based on the grant request; and performing, based on the grant response, virtual resource management for the NS LCM operation performed for the first NS instance.

For specific implementations of operations performed by the processor included in the NFVO, refer to the steps and functions performed by the first NFVO in Embodiments 1 to 7. Details are not repeated in this embodiment of this application.

Figure 15:
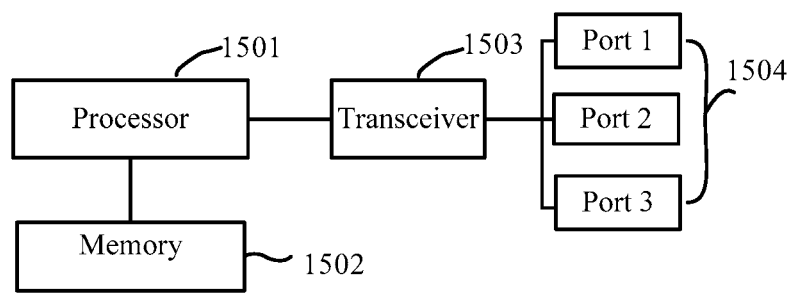
FIG. 15 is a schematic diagram of a general physical structure of an NFVO according to another embodiment of this application.

Embodiment 10 of this application provides a schematic structural diagram of an NFVO, as shown in FIG. 15. The NFVO may include one or more ports 1504, coupled to a transceiver 1503. The transceiver 1503 may be a transmitter, a receiver, or a combination thereof, and sends a data packet to or receives a data packet from another network node through the ports 1504. A processor 1501 is coupled to the transceiver 1503, and is configured to process a data packet. The processor 1501 may include one or more multi-core processors and/or a memory 1502. The processor 1501 may be a general purpose processor, an application-specific integrated circuit (ASIC), or a digital signal processor (DSP).

In another embodiment, the memory 1502 stores computer executable program code, where the program code includes an instruction, and when the processor 1501 executes the instruction, the network element performs the following operations:

receiving an NS LCM operation grant request sent by a first NFVO, where the grant request carries an identifier of a first NS instance and a type of an NS LCM operation;

determining, based on the identifier of the first NS instance, the type of the NS LCM operation, and a virtual resource view of a second NS instance managed by the NFVO, whether the NS LCM operation performed for the first NS instance affects the second NS instance managed by the NFVO; and sending a grant response to the first NFVO based on a determining result.

For specific implementations of operations performed by the processor included in the NFVO, refer to the steps and functions performed by the second NFVO in Embodiments 1 to 7. Details are not repeated in this embodiment of this application.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes any medium that can store program code, such as a ROM, a RAM, a magnetic disk, or an optical disc. Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A network service life cycle management grant method, the method comprising:

receiving, by a first network functions virtualization orchestrator (NFVO), a network service (NS) life cycle management (LCM) operation request, wherein the NS LCM operation request carries an identifier of a first NS instance and a type of an NS LCM operation;

sending, by the first NFVO, a grant request to a second NFVO, based on the NS LCM operation request, to request the second NFVO to permit the first NFVO to perform the NS LCM operation for the first NS instance, wherein the grant request carries the identifier of the first NS instance and the type of the NS LCM operation;

sending, by the second NFVO, a grant response based on the grant request; and performing, by the first NFVO based on the grant response, the NS LCM operation for the first NS instance.

2. The grant method according to claim 1, wherein the sending, by the first NFVO, a grant request to a second NFVO based on the NS LCM operation request comprises:

obtaining, by the first NFVO, a stored tenant identifier based on the identifier of the first NS instance, and obtaining identification information of the second NFVO based on the tenant identifier; and sending, by the first NFVO, the grant request to the second NFVO based on the identification information of the second NFVO.

3. The grant method according to claim 1, wherein the first NS instance managed by the first NFVO is a member of a second NS instance managed by the second NFVO.

4. The grant method according to claim 1, wherein the grant request further comprises:
    a virtual resource management plan for the NS LCM operation performed for the first NS instance.

5. The grant method according to claim 4, wherein the virtual resource management plan comprises:
    at least one of the group consisting of: a type, a quantity, and a location of a virtual resource that needs to be added, deleted, or modified for the NS LCM operation with reference to a status of a current resource used by the first NS instance; or
    at least one of the group consisting of: a type, a quantity, and a location of a virtual resource that is actually occupied in the NS LCM operation by a member VNF instance comprised in the first NS instance, and
    at least one of the group consisting of: —a type, a quantity, and a location of a virtual resource that is actually occupied in the NS LCM operation by a member VL instance comprised in the first NS instance.

6. The grant method according to claim 1, wherein the method further comprises:
    determining, by the second NFVO based on the identifier of the first NS instance, the type of the NS LCM operation, and a virtual resource view of the second NS instance managed by the second NFVO, whether the NS LCM operation performed for the first NS instance affects the second NS instance managed by the second NFVO; and
    sending the grant response to the first NFVO based on a determining result.

7. The grant method according to claim 6, wherein the second NFVO determines, based on at least one piece of the following stored information:
    whether the NS LCM operation performed for the first NS instance affects the second NS instance managed by the second NFVO;
    at least one of the group consisting of:
        a running status of a member NS instance that is of the second NS instance managed by the second NFVO and that has a dependency relationship with the first NS instance, and
        a running status of a member VNF instance that is of the second NS instance managed by the second NFVO and that has a dependency relationship with the first NS instance;
    at least one of an affinity rule and anti-affinity rule that is defined under the second NS instance managed by the second NFVO and that is associated with the first NS instance; and
    a grant policy for an NS LCM operation performed for the second NS instance.

8. The grant method according to claim 6, wherein the grant response comprises an operation success indication indicating permitting the first NFVO to perform the NS LCM operation for the first NS instance, and
    wherein the performing, by the first NFVO based on the grant response, virtual resource management for the NS LCM operation performed for the first NS instance comprises:
        performing, by the first NFVO, virtual resource management based on the virtual resource management plan for the NS LCM operation performed for the first NS instance.

9. The grant method according to claim 6, wherein the method further comprises:
    updating, by the second NFVO based on the virtual resource view of the second NS instance managed by the second NFVO and at least one piece of the information stored in the second NFVO, the virtual resource management plan for the NS LCM operation performed for the first NS instance,
    wherein the grant response comprises:
        an operation success indication indicating permitting the first NFVO to perform the NS LCM operation for the first NS instance, and
        a virtual resource management plan that is updated by the second NFVO for the NS LCM operation performed for the first NS instance, and
    wherein the performing, by the first NFVO based on the grant response, virtual resource management for the NS LCM operation performed for the first NS instance comprises:
        performing, by the first NFVO, virtual resource management based on the updated virtual resource management plan for the NS LCM operation performed for the first NS instance.

10. A network service life cycle management system, including a first network functions virtualization orchestrator (NFVO) and a second NFVO,
    wherein the first NFVO comprises:
        a transceiver;
        one or more processors; and
        non-transitory computer-readable memory storing a program to be executed by the one or more processors, the program including instructions to:
            receive a network service (NS) life cycle management (LCM) operation request, wherein the NS LCM operation request carries an identifier of a first NS instance and a type of an NS LCM operation via the transceiver;
            send a grant request to a second NFVO based on the NS LCM operation request, to request the second NFVO to permit the NFVO to perform the NS LCM operation for the first NS instance, wherein the grant request carries the identifier of the first NS instance and the type of the NS LCM operation via the transceiver;
            receive a grant response sent by the second NFVO based on the grant request via the transceiver; and
            perform, based on a grant response from the second NFVO, the NS LCM operation for the first NS instance; and
    wherein the second NFVO comprises:
        a transceiver;
        one or more processors; and
        non-transitory computer-readable memory storing a program to be executed by the one or more processors, the program including instructions to:
            send the grant response to the first NFVO based on the grant request.

11. The system according to claim 10, the program of the first NFVO further including instructions to:
    obtain a stored tenant identifier based on the identifier of the first NS instance, and obtain identification information of the second NFVO based on the tenant identifier; and send the grant request to the second NFVO based on the identification information of the second NFVO.

12. The system according to claim 10, wherein the first NS instance managed by the first NFVO is a member of a second NS instance managed by the second NFVO.

13. The system according to claim 10, wherein the program of the second NFVO is configured to:
   determine, based on the identifier of the first NS instance, the type of the NS LCM operation, and a virtual resource view of the second NS instance managed by the second NFVO, whether the NS LCM operation performed for the first NS instance affects the second NS instance managed by the second NFVO; and
   send the grant response to the first NFVO based on a result of the determining whether the NS LCM operation performed for the first NS instance affects the second NS instance managed by the second NFVO.

14. The system according to claim 13, wherein the program of the second NFVO is configured to:
   determine whether the NS LCM operation performed for the first NS instance affects the second NS instance managed by the second NFVO, based on at least one piece of the following stored information:
      at least one of a running status of a member NS instance that is of the second NS instance managed by the second NFVO and that has a dependency relationship with the first NS instance, and a running status of a member VNF instance that is of the second NS instance managed by the second NFVO and that has a dependency relationship with the first NS instance;
      at least one of an affinity and anti-affinity rule that is defined under the second NS instance managed by the second NFVO and that is associated with the first NS instance; and/or
      a grant policy for an NS LCM operation performed for the second NS instance.

15. The system according to claim 13, wherein the grant response comprises an operation success indication indicating permitting the first NFVO to perform the NS LCM operation for the first NS instance, and
   wherein the first NFVO is configured to perform, based on the grant response, the virtual resource management for the NS LCM operation performed for the first NS instance by:
      performing, by the first NFVO, virtual resource management based on the virtual resource management plan for the NS LCM operation performed for the first NS instance.

16. The system according to claim 13,
   wherein the second NFVO is configured to update, based on the virtual resource view of the second NS instance managed by the second NFVO and at least one piece of the information stored in the second NFVO, the virtual resource management plan for the NS LCM operation performed for the first NS instance,
   wherein the grant response comprises:
      an operation success indication indicating permitting the first NFVO to perform the NS LCM operation for the first NS instance, and
      a virtual resource management plan that is updated by the second NFVO for the NS LCM operation performed for the first NS instance, and
   wherein the first NFVO is configured to perform, based on the grant response, the virtual resource management for the NS LCM operation performed for the first NS instance by:
      performing, by the first NFVO, virtual resource management based on the updated virtual resource management plan for the NS LCM operation performed for the first NS instance.

17. The system according to claim 10, wherein the grant request further comprises:
   a virtual resource management plan for the NS LCM operation performed for the first NS instance.

18. The system according to claim 17, wherein the virtual resource management plan comprises:
   at least one of the group consisting of: a type, a quantity, and a location of a virtual resource that needs to be added, deleted, or modified for the NS LCM operation with reference to a status of a current resource used by the first NS instance; or
   at least one of the group consisting of: a type, a quantity, and a location of a virtual resource that is actually occupied in the NS LCM operation by a member VNF instance comprised in the first NS instance, and
   at least one of the group consisting of: a type, a quantity, and a location of a virtual resource that is actually occupied in the NS LCM operation by a member VL instance comprised in the first NS instance.

* * * * *